(12) United States Patent
Mafra-Neto et al.

(10) Patent No.: US 12,082,579 B2
(45) Date of Patent: Sep. 10, 2024

(54) COMPOSITIONS AND METHODS TO MANAGE HEMIPTERA

(71) Applicant: ISCA Technologies, Inc., Riverside, CA (US)

(72) Inventors: Agenor Mafra-Neto, Riverside, CA (US); Rodrigo Oliveira Da Silva, Riverside, CA (US); Rafael Borges, Fraiburgo (BR); Carmem Bernardi, Riverside, CA (US)

(73) Assignee: ISCA Technologies, Inc., Riverside, CA (US)

( * ) Notice: Subject to any disclaimer, the term of this patent is extended or adjusted under 35 U.S.C. 154(b) by 0 days.

(21) Appl. No.: 18/055,755

(22) Filed: Nov. 15, 2022

(65) Prior Publication Data

US 2023/0148595 A1    May 18, 2023

Related U.S. Application Data

(60) Provisional application No. 63/264,078, filed on Nov. 15, 2021.

(51) Int. Cl.
*A01N 37/06* (2006.01)
*A01P 19/00* (2006.01)

(52) U.S. Cl.
CPC .............. *A01N 37/06* (2013.01); *A01P 19/00* (2021.08)

(58) Field of Classification Search
None
See application file for complete search history.

(56) References Cited

FOREIGN PATENT DOCUMENTS

CN          101366388 A  *  2/2009
WO    WO-2022063693 A1  *  3/2022

* cited by examiner

*Primary Examiner* — Alton N Pryor
(74) *Attorney, Agent, or Firm* — Benjamin Diederich

(57) ABSTRACT

Compositions and methods for affecting Hemiptera. The compositions contain an alkyl ester of (2,4)-decadienoic acid. The compositions attract Hemiptera. The compositions may further include a toxicant.

4 Claims, No Drawings

COMPOSITIONS AND METHODS TO MANAGE HEMIPTERA

CROSS-REFERENCE TO RELATED APPLICATIONS

This application claims the benefit of U.S. Provisional Application No. 63/264,078 filed on Nov. 15, 2021, the teaching of which are expressly incorporated by reference.

STATEMENT RE: FEDERALLY SPONSORED RESEARCH/DEVELOPMENT

Not Applicable

BACKGROUND

The present disclosure relates generally to compositions, systems, and methods to attract and suppress row crops pests of the genera *Nezara, Tibraca, Diceraeus (Dichelops), Piezodorus, Oebalus, Edessa,* and *Chinavia*. More particularly, the present disclosure relates to compositions comprising an alkyl ester of (2,4)-decadienoic acid, like Ethyl-2,4-decadienoate (Pear ester). These compositions can be employed in a broad range of means, including a monolithic lure and attractant-impregnated adhesive to be deployed in monitoring traps, and a liquid formulation that can be blended with insecticide to create an attract and kill product amenable to spray application. It is also deployable in larger quantities in strategically placed, self-contained bait stations.

In general, insects of all species rely predominantly on chemicals detected in their environment for virtually every critical aspect of their lives, from females' selection of appropriate sites upon which to deposit their eggs, location of desirable habitats and food sources and the avoidance of undesirable ones, to the finding and selection of a mate. These behavior-modifying chemicals, known collectively as semiochemicals, have often been used in attempts to manage or suppress insect pest populations through a wide variety of methods, such as mating disruption (artificial treatment of a vulnerable field or environment with synthetic sex pheromone in such a way that the male insect is unable to locate a mate within that field); the placement of an attractant in a monitoring trap or as part of a mass trapping program; repellency, to drive insects away from susceptible host organisms; and attract and kill (A&K), in which an attractant is applied in combination with a killing agent, typically a small quantity of insecticide, to draw insects to a defined location and kill them before they can either reproduce or cause any damage or disease to host organisms.

Stink bugs (Hemiptera) are increasingly becoming major pests of corn crops. In particular, the green-belly stink bug, *Diceraeus (Dichelops) melacanthus* (Hemiptera: Pentatomidae) is a major corn crop pest. Diceraeus melacanthus adults and nymphs can feed on developing corn seeds. However, they also feed and cause problems during early vegetative stages. Additionally, the brown sting bug, *Euschistus heros*, is a major pest of soybean crops. As such, there is a need for an economical and efficient attractant for stink bugs (Hemiptera), that is capable of being used in combination with a pesticide in an attract and kill system, in lures, and in other tools to monitor, suppress, and control stink bug populations.

For monitoring purposes, this attractant could be deployed as a long-lasting monolithic lure, to be placed in virtually any type of trap, or it could be blended directly into an adhesive for a sticky trap. The attractant can also be blended with a small quantity of insecticide to create an A&K formulation. Broadly-defined, the A&K technique of pest control consists of attracting adult males, females, or both sexes of a pest species to an insect control agent (e.g., insecticide, sterilant, or insect pathogen). The insect attractant can be a chemical attractant, a visual cue, an acoustic cue, or a combination of these. A highly effective attractant and appropriate insecticide are indispensable ingredients of an effective A&K product. For such a formulation to work, insect pests must be lured to a toxicant, which they must contact and/or feed upon. Contact with the toxicant must then either kill the insect or, at minimum, result in sublethal effects that preclude that insect from effectively performing behaviors that are essential to its survival (feeding behavior, escape responses, etc.), or the survival of its population (effective courtship, mating success). The attractant must be at least as effective, if not more so, as attractants naturally present in the environment, so that the A&K formulation successfully out-competes them and lures the insect pest to the control agent. In many cases, the A&K also contains phagostimulants that induce the insect pest to consume the toxicant formulation. One way for A&K formulations to outcompete existing, natural sources of the stimuli in the treated environment, is by having point sources present at significantly higher densities than the competing natural sources, and/or by being significantly more attractive to the target pest.

Though both methods rely on chemical toxicants to suppress pest populations, A&K techniques present many advantages over cover sprays of conventional insecticides. Attract and kill typically deploys smaller amounts of toxicants, often contained within discrete point sources and coupled to a species-specific attractant, reducing the likelihood of negative environmental and non-target effects. There are also substantial economic benefits to the use of A&K over blanket pesticide sprays.

BRIEF SUMMARY

In accordance with one embodiment of the present disclosure, there is contemplated a composition for affecting Hemiptera. The composition includes an alkyl ester of (2,4)-decadienoic acid. Particular Hemiptera genera that may be affected by the composition include, but are not limited to, *Nezara, Tibraca, Diceraeus (Dichelops), Piezodorus, Oebalus, Edessa,* and *Chinavia*. More particularly, the Hemiptera may be *Diceraus melacanthus, Nezara viridula, Piezodorus guildinii, Tibraca limbativentris, Chinavia impicticornis,* and/or *Edessa meditabunda*. The composition may be used to attract Hemiptera.

The alkyl ester may be an ethyl ester, and more particularly may be (2E,4Z)-decadienoic acid ethyl ester. The alkyl ester may be a methyl ester, and more particularly may be (2E,4Z)-decadienoic acid methyl ester.

The composition may further include a toxicant. The toxicant may be a pesticide or a biocontrol agent. The composition contain approximately 0.001% to 80% alkyl ester of (2,4)-decadienoic acid, and more particularly may contain approximately 0.2% to 20% alkyl ester of (2,4)-decadienoic acid.

The composition may also include a substrate. In particular, examples of, and methods of making, suitable substrates are recited in U.S. Pat. No. 7,887,828 titled Dual Action Organic Formulation to Control Two Stages of Insect Pests, the entirety of which is incorporated by reference herein. The substrate may, for example, be a wax emulsion, microspheres, a latex solution, hot melt glue, a resin, or plastic flakes. In the case where the substrate is a wax emulsion, it may be a wax carrier such as a paraffin wax, carnauba wax, beeswax, candelilla wax, fruit wax, lanolin, shellac wax, bayberry wax, sugar cane wax, microcrystalline wax, ozocerite, ceresin, montan wax, or combinations thereof. In a particular embodiment, the wax emulsion may include 30% by weight paraffin wax; 4% by weight soy oil; 2% by weight sorbitan monostearate; 1% by weight vitamin E; and 58% by weight distilled water. In another embodiment, the wax emulsion may include 45% by weight microcrystalline wax; 6% by weight soy oil; 3% by weight sorbitan monostearate; 1% by weight vitamin E; and 40% by weight distilled water. In yet another embodiment, the substrate may be a hot melt glue. The hot melt glue may be, for example, a polymer of ethylene-vinyl acetate, polyethylene, polypropylene, a polyamide, or a polyester.

Another embodiment of the present disclosure is directed toward methods of affecting Hemiptera populations. The method includes administering a composition containing an alkyl ester of (2,4)-decadienoic acid to a region known or suspected to contain Hemiptera. The composition may be administered in numerous forms, including but not limited to, sprayable forms, slow release formulations, monolithic lures, sticky trap adhesives, attract and kill baits, film formers, wax and/or oil based emulsions, rubber septa, HDPE vials, pouches, fibers, and the like.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

According to the EPA, Ethyl-2E,4Z-decadienoate (pear ester) (CAS Number: 3025-30-7, FEMA Number: 3148, Molecular Weight: 196.29, Molecular Formula: C12H20O2) is a naturally occurring, volatile substance emitted from mature, ripening fruit, that is attractive to the codling moth, *Cydia pomonella*, a major agricultural pest of pome fruit worldwide. Male and female moths are attracted to pear ester and fly to the ripening fruit, where they mate and lay their eggs. Synthetic pear ester is structurally and functionally identical to the natural compound, and its intended pesticidal use is to disrupt codling moth mating behavior by attracting the moths away from the fruit, reducing their chances of finding mates and laying eggs in fruit orchards.

However, until the present disclosure, there has been no reference of which we are aware that pear ester acts as an attractant for any genus of stink bugs (Hemiptera), including, but not limited to *Tibraca, Dichelops (Dicaraeus), Acrosternun/Chinavia, Oebalus, Nezara, Piezodorus, Halymorpha,* or *Euschistus*.

A study was conducted to evaluate the effectiveness of pear ester versus regular pheromone to attract sting bugs. In particular, a study was conducted in a wheat harvest area in an attempt to attract the stink bug, *Diceraus melacanthus*. During a 24 hour period, split into six blocks, it was seen that the pear ester attraction rate was, at least, the same as the regular pheromone as shown in Table 1 below.

TABLE 1

| | Treatment | | |
| Block | Regular Pheromone | Pear Ester | Control |
| --- | --- | --- | --- |
| 1 | 2 | 3 | 0 |
| 2 | 0 | 1 | 0 |
| 3 | 1 | 0 | 0 |
| 4 | 0 | 0 | 0 |
| 5 | 2 | 3 | 0 |
| 6 | 1 | 1 | 0 |
| Mean | 1.00 | 1.33 | 0.00 |
| Standard Deviation | 0.89 | 1.37 | 0.00 |
| Sum | 6.00 | 8.00 | 0.00 |

As such, it can be seen that pear ester clearly has an attractant effect on stink bugs, including *Diceraus melacanthus*, as well as *Nezara viridula, Piezodorus guildinii, Tibraca limbativentris. Diceraeus, Chinavia* spp, *Edessa meditabunda*, and *Euschistus heros*

The above description is given by way of example, and not limitation. Given the above disclosure, one skilled in the art could devise variations that are within the scope and spirit of the invention disclosed herein, including the use of various pesticides, traps, and application methods to achieve the same intended effect. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A composition for attracting *Diceraus melacanthus*, the composition comprising an alkyl ester of (2,4)-decadienoic acid, wherein the alkyl ester of (2,4)-decadienoic acid attracts *Diceraus melacanthus*.

2. A composition for attracting *Tibraca limbativentris*, the composition comprising an alkyl ester of (2,4)-decadienoic acid, wherein the alkyl ester of (2,4)-decadienoic acid attracts *Tibraca limbativentris*.

3. A composition for attracting *Chinavia impicticornis*, the composition comprising an alkyl ester of (2,4)-decadienoic acid, wherein the alkyl ester of (2,4)-decadienoic acid attracts *Chinavia impicticornis*.

4. A composition for attracting *Edessa meditabunda*, the composition comprising an alkyl ester of (2,4)-decadienoic acid, wherein the alkyl ester of (2,4)-decadienoic acid attracts *Edessa meditabunda*.

* * * * *